(12) United States Patent
An et al.

(10) Patent No.: US 9,758,076 B2
(45) Date of Patent: Sep. 12, 2017

(54) AUTOMATIC HEADREST

(71) Applicants: HYUNDAI DYMOS INCORPORATED, Seosan-si, Chungcheongnam-do (KR); SEOYONCNF CO., LTD., Ulju-gun, Ulsan (KR)

(72) Inventors: Sung Chol An, Hwaseong-si (KR); Jin Ho Seo, Yongin-si (KR); Jun Kyu Kim, Hwaseong-si (KR); Myeong Sub Kim, Seongnam-si (KR); Yun Ho Kim, Osan-si (KR); Dong Hwan Kim, Hwaseong-si (KR); Ju Sung Ha, Ulsan (KR); Woo Jung Jang, Ulsan (KR)

(73) Assignees: Hyundai Dymos Incorporated, Seosan-si (KR); Seoyoncnf Co., Ltd., Ulju-gun (KR)

( * ) Notice: Subject to any disclaimer, the term of this patent is extended or adjusted under 35 U.S.C. 154(b) by 0 days.

(21) Appl. No.: 15/375,922

(22) Filed: Dec. 12, 2016

(65) Prior Publication Data

US 2017/0174108 A1 Jun. 22, 2017

(30) Foreign Application Priority Data

Dec. 21, 2015 (KR) .......................... 10-2015-0182923

(51) Int. Cl.
*B60N 2/48* (2006.01)
*B60N 2/02* (2006.01)

(52) U.S. Cl.
CPC ......... *B60N 2/4852* (2013.01); *B60N 2/0232* (2013.01); *B60N 2002/0236* (2013.01)

(58) Field of Classification Search
CPC ............... B60N 2/4852; B60N 2/0232; B60N 2002/0236
USPC ......................................................... 297/408
See application file for complete search history.

(56) References Cited

U.S. PATENT DOCUMENTS

| 5,026,120 A * | 6/1991 | Takeda ................. B60N 2/4808 297/406 |
| 2001/0028191 A1* | 10/2001 | Lance ...................... A47C 7/38 297/410 |
| 2006/0226689 A1* | 10/2006 | Linnenbrink ........ B60N 2/4829 297/408 |

(Continued)

FOREIGN PATENT DOCUMENTS

| JP | 4436238 B2 | 3/2010 |
| KR | 10-0775371 B1 | 11/2007 |
| KR | 10-1553527 B1 | 9/2015 |

*Primary Examiner* — Milton Nelson, Jr.
(74) *Attorney, Agent, or Firm* — Brinks Gilson & Lione

(57) ABSTRACT

The present disclosure provides an automatic headrest including: a headrest cushion configured to couple to a stay rod of a vehicle seat back; an actuation module configured to couple to the stay rod; a cushion bracket configured to couple to a rear surface of the headrest cushion; an actuation link having a plate shape; a motor link, wherein one side of the motor link is configured to couple to the actuation module and the other side of the motor link is configured to extend downward; and a guide link having a plate shape, wherein one side of a top portion of the guide link is configured to couple to the cushion bracket, the other side of the top portion of the guide link is configured to couple to the actuation link, and a bottom portion of the guide link is configured to couple to the motor link.

7 Claims, 4 Drawing Sheets

(56) References Cited

U.S. PATENT DOCUMENTS

| | | | |
|---|---|---|---|
| 2009/0236891 A1* | 9/2009 | Ito | B60N 2/0232 297/354.12 |
| 2012/0261968 A1* | 10/2012 | Bittinger | B60N 2/487 297/391 |
| 2016/0250953 A1* | 9/2016 | Yoo | B60N 2/4829 297/410 |

* cited by examiner

FIG. 1 "Prior Art"

AUTOMATIC HEADREST

CROSS-REFERENCE TO RELATED APPLICATION

This application claims priority to and the benefit of Korean Patent Application No. 10-2015-0182923 filed on Dec. 21, 2015, which is incorporated herein by reference in its entirety.

FIELD

The present disclosure relates to an automatic headrest which can allow a headrest provided in an upper part of a seat to cover and support a head of a passenger more conveniently and comfortably per the passenger's preference.

BACKGROUND

The statements in this section merely provide background information related to the present disclosure and may not constitute prior art.

A headrest for a vehicle prevents damage to neck and head portions by neck bending during a collision and provides comfortable ride experience by holding the head portion during normal driving. As illustrated in FIG. 1, the headrest is installed on the top of a seat back to support the head and neck portions of a passenger. The headrest includes a headrest cushion 20 and a stay rod 30 connected to a seat frame 10. A headrest pole 40 is formed in the stay rod 30 and connected to the seat frame 10 in order to move up and down in a vertical direction of the headrest cushion 20. Accordingly, height adjustment suitable for a height and needs of the passenger is performed through adjusting the height of the headrest.

The headrest in the related art has an actuation mechanism structure 50 configured in the seat back and a section which is actuatable in the seat back as well as an actuatable range of the stay rod of the headrest is limited. Further, since a head cannot be stably supported at a position after unintended external force (a rear collision, and the like) is applied, there are safety problems including an increase in neck injury level, and the like. Moreover, a driver or passenger needs to stretch out to the rear of a head while an actuation unit is not seen in order to adjust the headrest in a seating state, and since the headrest cannot be seen, when an actuation direction is not recognized, it is difficult to actuate the headrest. Further, when the user actuates the headrest while facing the headrest front, it is difficult to accurately adjust the headrest to fit his or her seating state.

SUMMARY

The present disclosure provides an automatic headrest which can more conveniently support a head by implementing a larger actuation range than the related art. Specifically, the present disclosure provides a reclining structure capable of actuating in an anteroposterior direction in a headrest regardless of a package configuration of a seat back to provide convenience which conforms to a sitting posture of a user.

One form of the present disclosure provides an automatic headrest including: a headrest cushion configured to couple to a stay rod of a vehicle seat back; an actuation module configured to couple to the stay rod, the actuation module including: a motor, and a screw configured to move forward and backward by the motor; a cushion bracket configured to couple to a rear surface of the headrest cushion, the cushion bracket including: an extension portion configured to extend to a rear side of the headrest cushion and to have a slit hole formed thereof, and a coupling portion configured to protrude to the rear side of the headrest cushion; an actuation link having a plate shape, the actuation link configured to: have a predetermined thickness, couple to the screw of the actuation module at the rear side of the headrest cushion, and have a guide unit with a slit hole configured to extend on the top of the actuation link, and a hinge portion configured to extend on the bottom of the actuation link to move forward and backward when the actuation module is actuated; a motor link, wherein one side of the motor link is configured to couple to the actuation module and the other side of the motor link is configured to extend downward; and a guide link having a plate shape, wherein one side of a top portion of the guide link is configured to couple to the cushion bracket, the other side of the top portion of the guide link is configured to couple to the actuation link, and a bottom portion of the guide link is configured to couple to the motor link.

The coupling portion of the cushion bracket may be configured to form on the bottom of the extension portion of the cushion bracket.

A plurality of the coupling portions and the extension portions of the cushion bracket may be configured to form to be spaced apart from each other by a predetermined distance, the guide unit and the hinge portion may be configured to form on both surfaces of the actuation link, respectively, and the hinge portion of the actuation link is configured to pin-couple to the coupling portion to be pivotable.

The bottom of the guide link may be configured to pin-couple to the other side of the motor link.

One side of the guide link may be configured to pin-couple to the slit hole of the extension portion of the cushion bracket and the guide link may move within the slit hole of the extension portion by the actuation of the actuation module.

The other side of the guide link may be configured to pin-couple to the slit hole of the guide unit of the actuation link, and as a result, the other side may move within the slit hole.

The automatic headrest may further include a cover configured to cover the rear surface of the headrest cushion at the rear side of the headrest cushion.

As compared with the headrest actuation structure in the related art, a guide link is supported by a motor link by adding the motor link to strengthen structural stability, and as a result, a gap generated between a cushion bracket, and the guide link and the actuation link is removed at the time of using the headrest cushion. The headrest cushion more stiffly and conveniently supports a head part of a user by removing the gap between the components to secure a stroke which meets requirements of the user. As such, the convenience and comfort of the user are enhanced.

Further, a free safe function may be implemented by additionally combining a separate sensor, and the like to the present disclosure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
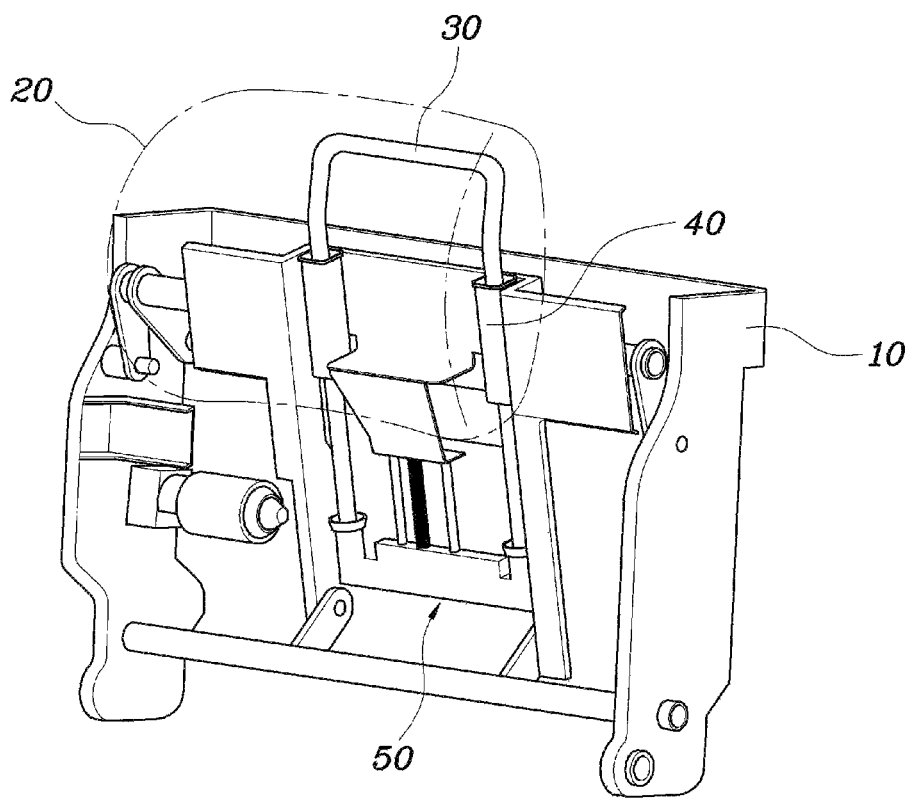
FIG. 1 is a diagram illustrating an automatic headrest in the related art.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
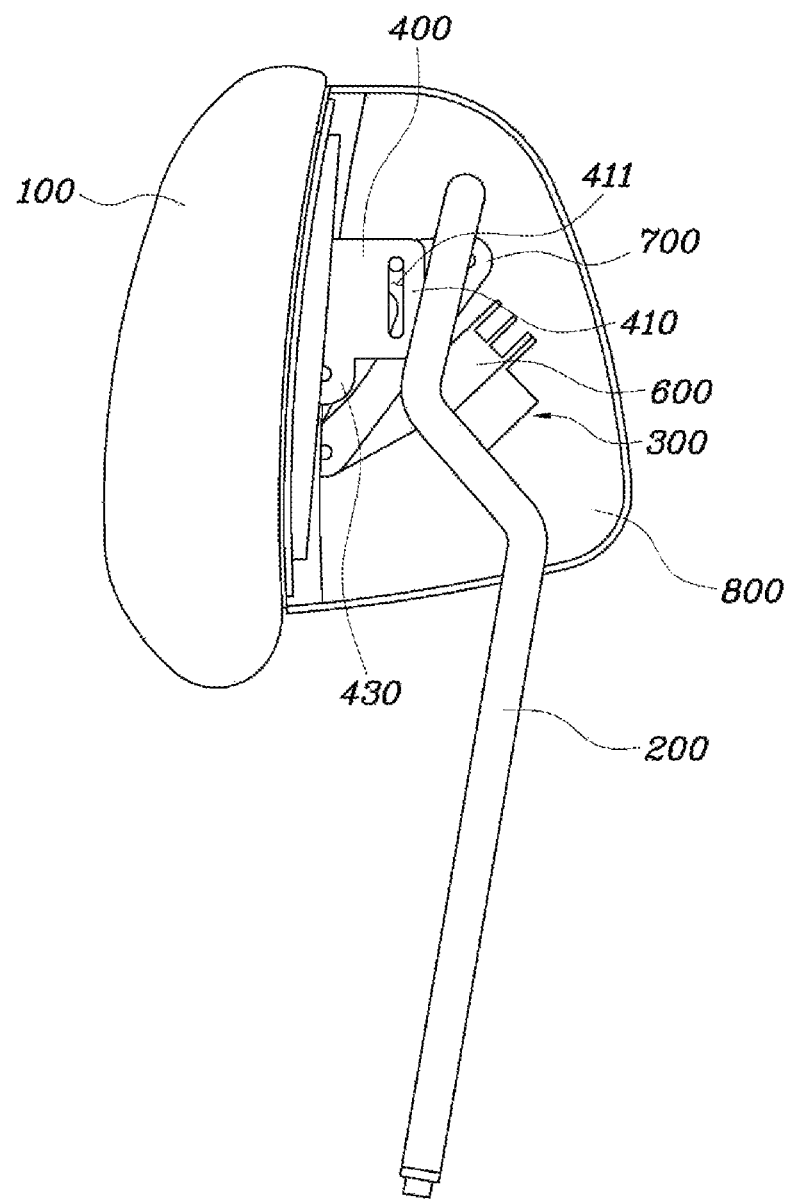
FIG. 2 is a diagram illustrating an automatic headrest.
Figure 3:
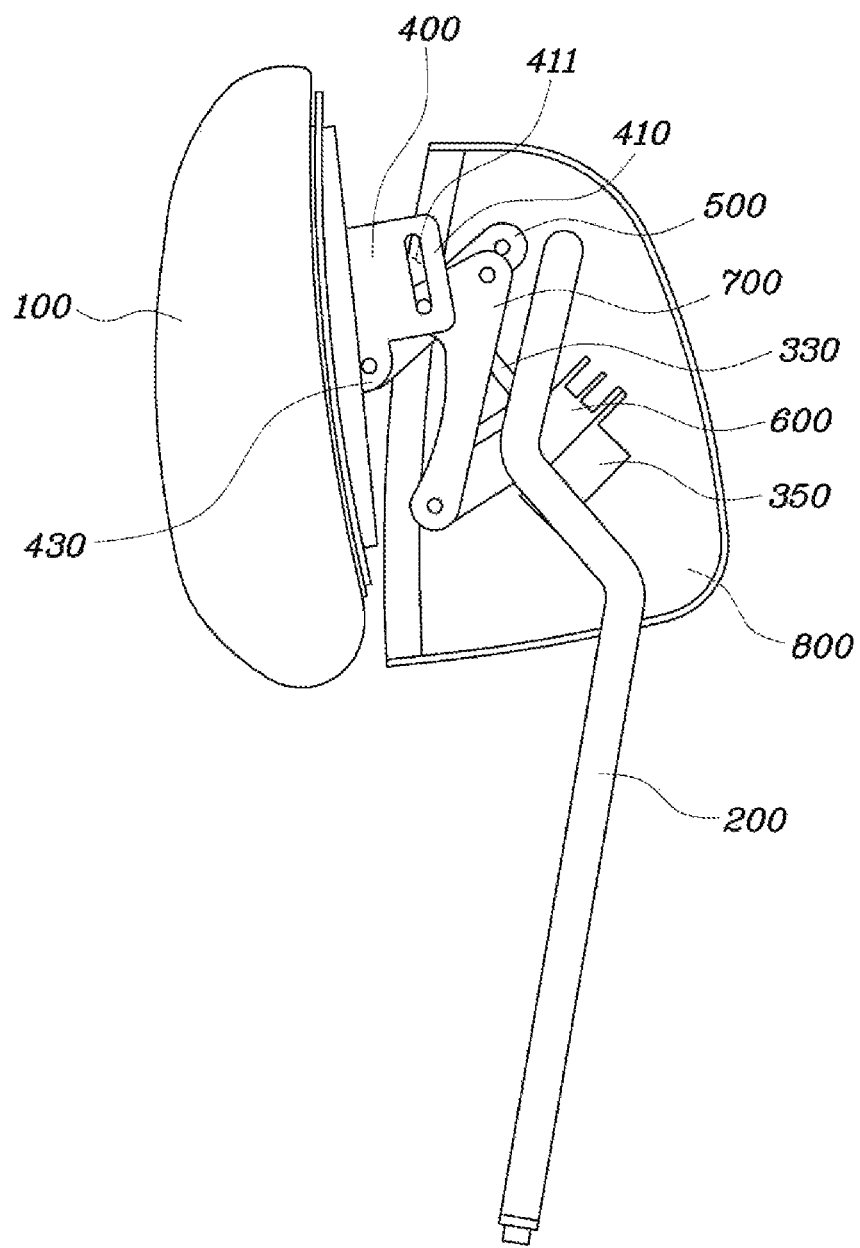
FIG. 3 is a diagram illustrating a shape after an actuation of FIG. 2.
Figure 4:
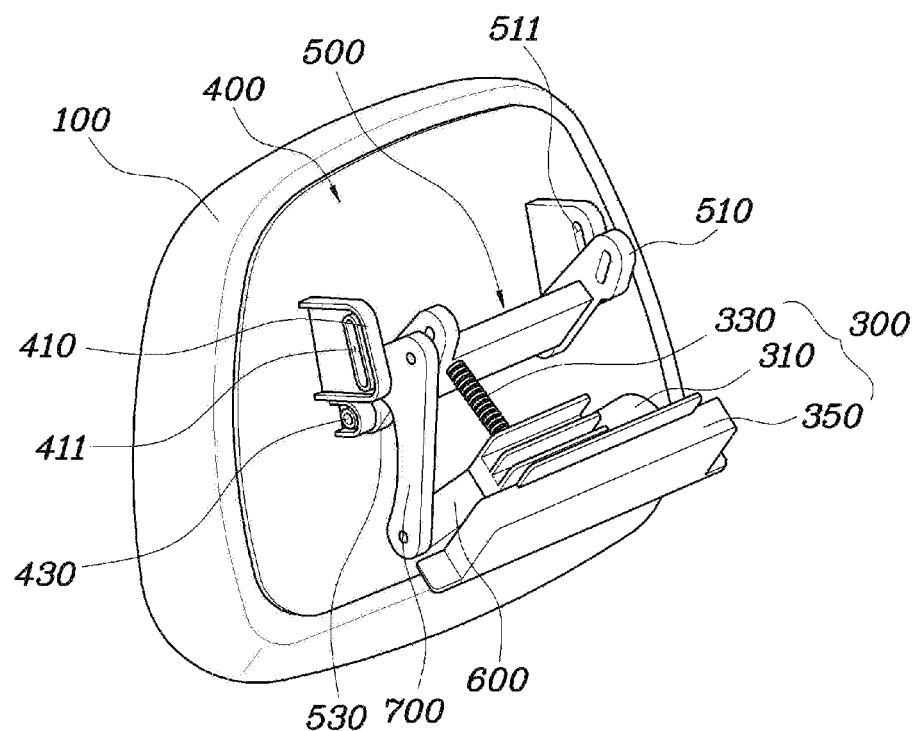
FIG. 4 is a diagram illustrating, in detail, a rear side of a headrest cushion of FIG. 3.

FIG. 2 is a diagram illustrating an automatic headrest according to one form of the present disclosure, FIG. 3 is a diagram illustrating a shape after an actuation of FIG. 2, and FIG. 4 is a diagram illustrating, in detail, a rear side of a headrest cushion 100 of FIG. 3.

The automatic headrest according to one form of the present disclosure includes: a headrest cushion 100 configured to couple to a stay rod 200 of a vehicle seat back (not illustrated) ; an actuation module 300 configured to couple to the stay rod 200 and including a motor 310 and a screw 330 configured to move forward and backward by the motor 310; a cushion bracket 400 configured to couple to a rear surface of the headrest cushion 100 and including an extension portion 410 configured to extend to a rear side of the headrest cushion and to have a slit hole 411, and a coupling portion configured to protrude to the rear side of the headrest cushion; an actuation link 500 having a plate shape configured to have a predetermined thickness, to couple to the screw 330 of the actuation module 300 at the rear side of the headrest cushion 100, and to have a guide unit 510 with a slit hole 511 configured to extend on the top of the actuation link, and a hinge portion 530 configured to extend on the bottom of the actuation link to move forward and backward when the actuation module 300 is actuated; a motor link 600 of which one side is configured to couple to the actuation module 300 and the other side of the motor link is configured to extend downward; and a guide link 700 having a plate shape, of which one side of a top portion of the guide link is configured to couple to the cushion bracket 400, the other side of the top portion of the guide link is configured to couple to the actuation link 500, and the bottom portion of the guide link is configured to couple to the motor link 600.

The automatic headrest is a device in which an angle of the headrest cushion 100 may be adjusted by force of the motor 310, and the stay rod 200 is configured to couple to the top of the vehicle seat back and the headrest cushion 100 is configured to couple to the front side of the stay rod 200. The actuation module 300 constituted by the motor 310 coupled to the stay rod 200 by a bracket 350 and the screw 330 driven by the motor is coupled between the stay rod 200 and the headrest cushion 100. The screw 330 operates by driving the motor 310, and as a result, the headrest cushion 100 may move forward and backward.

The cushion bracket 400 having a size corresponding to an area of the headrest cushion 100 is coupled to the rear surface of the headrest cushion 100. The extension portion 410 which is extended to the rear side and has the slit hole 411 formed in the vertical direction is formed in the cushion bracket 400. The coupling portion 430 which protrudes to the rear side of the headrest cushion 100 is formed on the bottom of the extension portion 410. A plurality of coupling portions 430 and extension portions 410 of the cushion bracket 400 forms a pair to be spaced apart from each other by a predetermined distance.

The actuation link 500 having the plate shape with the predetermined thickness is coupled between the actuation module 300 and the cushion bracket 400. The actuation link 500 is coupled to the screw 330 of the actuation module at the rear side of the headrest cushion 100. Further, the guide unit 510 with the slit hole 511 is extended to the top of the actuation link 500 and the hinge portion 530 is extended to the bottom of the actuation link 500. When the actuation module 300 is actuated, the actuation link 500 moves forward and backward. Accordingly, an operation is performed based on the center of each of the guide unit 510 and the hinge portion 530. Therefore, since a stroke amount in which the headrest cushion 100 moves forward and backward can be determined through the length of the slit hole 511 of the guide unit 510 of the actuation link 500, other configurations may be available only by changing the length of the slit hole 511 as necessary. Further, the guide unit 510 and the hinge portion 530 form the pair to be formed at both sides, respectively. Accordingly, the hinge portion 530 of the actuation link 500 is formed at a position corresponding to the coupling portion 430 of the cushion bracket 400 and the coupling portion 430 and the hinge portion 530 are pin-coupled to each other to be rotatable primarily by pin-coupling.

The motor link 600 having the plate shape may be configured to form on the top of the motor 310 in the actuation module 300 so as to cover a part of the motor 310. One side of the motor link 600 is configured to couple to the motor 310 of the actuation module 300 and the other side is configured to extend downward.

Further, the guide link 700 having the plate shape may be formed, which is simultaneously coupled to the cushion bracket 400, the actuation link 500, and the motor link 600. The guide link 700 may be configured to have three apexes so that one side of the top is configured to couple to the cushion bracket 400, the other side of the top is configured to couple to the actuation link 500, and the bottom is configured to couple to the motor link 600.

Accordingly, the bottom of the guide link 700 may be configured to pin-couple to the other side of the motor link 600. One side of the top of the guide link 700 is configured to pin-couple to the slit hole 411 of the extension portion 410 of the cushion bracket 400 and the pin may move in the vertical direction in the slit hole 411 of the extension portion 410 with the actuation of the actuation module 300 and the other side of the top of the guide link 700 is configured to pin-couple to the slit hole 511 of the guide unit 510 of the actuation link 500, and as a result, the pin may move in the vertical direction in the slit hole 511.

Further, the motor link 600 serves to adjust a gap generated by the guide link 700 by the actuation of the actuation module 300. When the bottom of the guide link 700 may not be supported, the headrest cushion 100 is pushed to the rear side by the gap at the time of pressing the headrest cushion 100 of the user, and as a result, a stroke is determined to be short. However, the guide link 700 is coupled to the motor link 600 and the guide link 700 is thus supported on the motor link 600 to remove the gap, and as a result, the headrest cushion 100 may more stably support a head of the user.

In one form of the present disclosure, it is illustrated and described that the guide link 700 is formed only at one side of each of the cushion bracket 400 and the actuation link 500, but it is discovered that shapes of the cushion bracket 400, the actuation link 500, the motor link 600, and the guide link 700 may be changed as many as you like according to the design or an environment.

Further, the automatic headrest may further include a cover 800 that covers the automatic headrest by covering the rear surface of the headrest cushion 100 at the rear side of the headrest cushion 100.

When the operation of the automatic headrest is described, when the user operates a switch (not illustrated) which is separately formed, and the like by adjusting the automatic headrest forward, the motor 310 of the actuation module 300 operates, and as a result, the screw 330 moves to the front and as the screw 330 moves, the actuation link 500 rotates around the coupling portion 430 of the cushion bracket 400 to move forward. Thereafter, the guide link 700 rotates primarily by pin-coupling of the fixed motor link 600 and the bottom of the guide link 700 and one side and the other side of the top of the guide link 700 slide downward in the slit hole 411 of the extension portion 410 of the cushion bracket 400 and the slit hole 511 of the guide unit 510 of the actuation link 500, respectively, and as a result, the headrest cushion 100 moves forward. When the headrest cushion 100 moves backward again, the headrest cushion 100 operates contrary to the operation and thus moves backward.

Accordingly, an automatic headrest actuation structure in the related art is mounted on the seat back, and as a result, there is a limit in an operation range, but when an actuation structure is mounted on the headrest itself, the operation range can be more widely secured. In particular, since a stroke amount in which a headrest cushion moves forward and backward can be determined through a length of a slit hole of a guide unit of an actuation link, other configurations are available only by changing the length of the slit hole as necessary.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An automatic headrest comprising:
a headrest cushion configured to couple to a stay rod of a vehicle seat back;
an actuation module configured to couple to the stay rod, the actuation module comprising:
a motor, and
a screw configured to move forward and backward by the motor;
a cushion bracket configured to couple to a rear surface of the headrest cushion, the cushion bracket comprising:
an extension portion configured to extend to a rear side of the headrest cushion and to have a slit hole formed thereof, and
a coupling portion configured to protrude to the rear side of the headrest cushion;
an actuation link having a plate shape, the actuation link configured to:
have a predetermined thickness,
couple to the screw of the actuation module at the rear side of the headrest cushion, and
have a guide unit with a slit hole configured to extend on the top of the actuation link, and a hinge portion configured to extend on the bottom of the actuation link to move forward and backward when the actuation module is actuated;
a motor link, wherein one side of the motor link is configured to couple to the actuation module and the other side of the motor link is configured to extend downward; and
a guide link having a plate shape, wherein one side of a top portion of the guide link is configured to couple to the cushion bracket, the other side of the top portion of the guide link is configured to couple to the actuation link, and a bottom portion of the guide link is configured to couple to the motor link.

2. The automatic headrest of claim 1, wherein the coupling portion of the cushion bracket is configured to form on the bottom of the extension portion of the cushion bracket.

3. The automatic headrest of claim 1, wherein a plurality of the coupling portions and the extension portions of the cushion bracket are configured to form to be spaced apart from each other by a predetermined distance, the guide unit and the hinge portion are configured to form on both surfaces of the actuation link, respectively, and the hinge portion of the actuation link is configured to pin-couple to the coupling portion to be pivotable.

4. The automatic headrest of claim 1, wherein the bottom of the guide link is configured to pin-couple to the other side of the motor link.

5. The automatic headrest of claim 1, wherein one side of the guide link is configured to pin-couple to the slit hole of the extension portion of the cushion bracket and to move within the slit hole of the extension portion by the actuation of the actuation module.

6. The automatic headrest of claim 1, wherein the other side of the guide link is configured to pin-couple to the slit hole of the guide unit of the actuation link and to move within the slit hole.

7. The automatic headrest of claim 1, further comprising a cover configured to cover the rear surface of the headrest cushion at the rear side of the headrest cushion.

* * * * *